(12) United States Patent
Nam et al.

(10) Patent No.: US 12,095,258 B2
(45) Date of Patent: Sep. 17, 2024

(54) RELAY TEMPERATURE MEASURING DEVICE AND METHOD

(71) Applicants: Hyundai Motor Company, Seoul (KR); Kia Corporation, Seoul (KR)

(72) Inventors: Dong-Jin Nam, Gyeonggi-do (KR); Sung-Hoon Choi, Gyeonggi-do (KR); Yu-Hyun Sung, Seoul (KR); Jeong-Min Shin, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 537 days.

(21) Appl. No.: 17/358,822

(22) Filed: Jun. 25, 2021

(65) Prior Publication Data

US 2021/0328421 A1 Oct. 21, 2021

Related U.S. Application Data

(62) Division of application No. 16/202,572, filed on Nov. 28, 2018, now Pat. No. 11,075,516.

(30) Foreign Application Priority Data

Apr. 26, 2018 (KR) .................. 10-2018-0048485

(51) Int. Cl.
*H02H 7/18* (2006.01)
*B60R 16/033* (2006.01)
(Continued)

(52) U.S. Cl.
CPC ............. *H02H 7/18* (2013.01); *B60R 16/033* (2013.01); *H01H 47/002* (2013.01);
(Continued)

(58) Field of Classification Search
CPC ........ H02H 7/18; H02H 1/0007; H02H 5/041; H02H 6/005; H02H 7/0007; B60R 16/033; B60R 16/02; H01H 47/002; H01H 47/26; H01H 2300/052; H01M 10/425; H01M 10/48; H01M 10/486; H01M 2010/4271;
(Continued)

(56) References Cited

U.S. PATENT DOCUMENTS 9,069,044 B2  6/2015  Tae
9,806,517 B2  10/2017 Mo et al.
(Continued)

FOREIGN PATENT DOCUMENTS

JP    2013158217 A    8/2013
JP    2017058257 A    3/2017
(Continued)

*Primary Examiner* — Zhongqing Wei
(74) *Attorney, Agent, or Firm* — Fox Rothschild LLP

(57) ABSTRACT

A relay temperature measuring device is provided. The device includes a sensor that measures an output of a battery and generates output measurement information and one or more relays that are disposed on a conductive line between the battery and a load. Additionally, a controller compares a relay temperature calculated using both-end measurement power information generated by measuring both ends of a conductor in a vehicle and the output measurement information with a preset temperature reference value, and connects or disconnects the relays based on a comparison result.

8 Claims, 7 Drawing Sheets

(51) Int. Cl.
  *H01H 47/00* (2006.01)
  *H01H 47/26* (2006.01)
  *H01M 10/42* (2006.01)
  *H01M 10/48* (2006.01)
  *H02H 1/00* (2006.01)

(52) U.S. Cl.
  CPC .......... *H01H 47/26* (2013.01); *H01M 10/425* (2013.01); *H01M 10/48* (2013.01); *H01M 10/486* (2013.01); *H02H 1/0007* (2013.01); *H01M 2010/4271* (2013.01); *H01M 2220/20* (2013.01)

(58) Field of Classification Search
  CPC . H01M 2220/20; H01M 10/446; Y02E 60/10; G01K 7/24; G01K 1/14
  USPC .......................................................... 429/61
  See application file for complete search history.

(56) References Cited

U.S. PATENT DOCUMENTS

| | | |
|---|---|---|
| 2013/0009648 A1 | 1/2013 | Tae |
| 2013/0257388 A1 | 10/2013 | Lee |
| 2015/0372477 A1 | 12/2015 | Mo et al. |
| 2016/0201634 A1* | 7/2016 | Kim ........................ B60L 50/64 320/136 |

FOREIGN PATENT DOCUMENTS

| | | |
|---|---|---|
| KR | 10-2013-0004827 A | 1/2013 |
| KR | 10-1521985 B1 | 5/2015 |

\* cited by examiner

RELAY TEMPERATURE MEASURING DEVICE AND METHOD

CROSS-REFERENCE TO RELATED APPLICATION

This application is a Divisional Application of U.S. patent application Ser. No. 16/202,572 filed on Nov. 28, 2018 which claims the benefit of Korean Patent Application No. 10-2018-0048485 filed on Apr. 26, 2018, the entire content of which are incorporated herein by reference.

BACKGROUND

Field of the Disclosure

The present disclosure relates to a relay temperature measuring technique, and more particular, to a relay temperature measuring device and method capable of protecting relay in a vehicle from an over-temperature.

Description of Related Art

To protect a relay, which connects/disconnects a conductive line between a battery and a load, from an over-temperature, the relay is equipped with a temperature sensor to break a current when an over-temperature occurs. Since an insulator is disposed between the temperature sensor and a conductor of the relay, there may be an error between an actual temperature and a measured temperature. Therefore, in response to determining that a current which is equal to or greater than a predetermined value flows, a correction coefficient is applied to the measured temperature to estimate the actual temperature.

However, a temperature sensor is required for each of the relays for which the temperature is to be measured, and a measuring region of the sensor should be attached to an inner conductor of the relay in a state in which an insulation is maintained. This leads to an increase in the number of overall parts and/or an increase in manufacturing cost. In addition, since a temperature increase of the conductor is influenced by a resistance value of the conductor in addition to the applied current, a temperature estimation is inaccurate by the correction coefficient according to the applied current.

In particular, when the temperature sensor is applied to the relay, an occurrence of an insulation breakdown of the conductor caused by a current and a voltage should be prevented while the temperature sensor is in contact with the inner conductor. In addition, it may be difficult to manufacture the relay, such as when a signal line of the temperature sensor is required to pass from the inside of the sealed relay to the outside of the relay.

SUMMARY

The present disclosure provides a relay temperature measuring device and method capable of measuring a resistance at both ends of a relay, which is a target to be prevented from an over-temperature, without using a temperature sensor and estimating the temperature using a relation between a resistance and a temperature. In addition, the present disclosure provides a relay temperature measuring device and method capable of protecting the relay from an over-temperature using the above manner.

The relay temperature measuring device according to an exemplary embodiment of the present disclosure may include a sensor configured to measure an output of a battery and generate output measurement information; one or more relays disposed on a conductive line between the battery and a load; and a controller configured to compare a relay temperature calculated using both-end measurement power information generated by measuring both ends of a conductor in a vehicle and the output measurement information with a preset temperature reference value, and connect or disconnect the relays based on a comparison result.

The relay temperature may be calculated using a temperature-dependent resistance table based on preset relay characteristics. Alternatively, the relay temperature may be calculated using a relation formula between a temperature and a resistance based on preset relay characteristics. Meanwhile, the controller does not calculate the relay temperature when the output measurement information is less than a preset output reference value of the battery.

Additionally, the controller does not calculate the relay temperature when the both-end measurement power information is less than a preset both-end measurement power reference value. The controller may be configured to disconnect the relays when the relay temperature is greater than the temperature reference value and the battery is in a state in which an output is restricted. The controller may also be configured to request a superordinate controller to restrict the output when the relay temperature is greater than the temperature reference value and the battery is not in a state in which an output is restricted.

Particularly, the relay may include a first relay disposed between a positive end of the battery and a load and a second relay disposed between a negative end of the battery and a load. The controller may include a measurement module configured to measure both ends of the conductor in the vehicle and generate the both-end measurement power information; and a judgement module configured to estimate the relay temperature of the relays using the both-end measurement power information and the output measurement information, compare the relay temperature with the reference value and connect or disconnect the relays based on the comparison result.

The both-end measurement power information may be information measured using any one of both ends of the relay, both ends of the conductor in the vehicle connected to the battery, both ends of a cable connected between an inverter and a converter, and both ends of a power line that connects the inverter and a motor. In addition, the controller may be configured to request a superordinate controller to adjust the output of the battery when the output measurement information is less than a preset output reference value of the battery and a measurement of the relay temperature is required according to vehicle information. The vehicle information may include vehicle-surrounding environmental temperature information, status information of the battery, and traveling condition information.

Another exemplary embodiment of the present disclosure provides a relay temperature measuring method that may include measuring an output of a battery to generate output measurement information; measuring both ends of a conductor in a vehicle to generate both-end measurement power information; comparing a relay temperature, which is calculated using the output measurement information, with a preset temperature reference value; and connecting or disconnecting one or more relay disposed on a conductive line between the battery and a load, based on a comparison result.

Additionally, generating the output measurement information may include not generating the both-end measurement power information when the output measurement information is less than a preset output reference value of the battery. The comparing of the relay temperature may include not calculating the relay temperature when the both-end measurement power information is less than a preset both-end measurement power reference value. Further, connecting or disconnecting the relays may include disconnecting the relays when the relay temperature is greater than the temperature reference value and the battery is in a state in which an output is restricted.

Further, connecting or disconnecting the relays may include allowing a controller to request a superordinate controller to restrict the output when the relay temperature is greater than the temperature reference value and the battery is not in a state in which an output is restricted. In addition, generating the output measurement information may include allowing a controller to request a superordinate controller to adjust the output of the battery the output measurement information is less than a preset output reference value of the battery and a measurement of the relay temperature is required according to vehicle information.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

Figure 1:
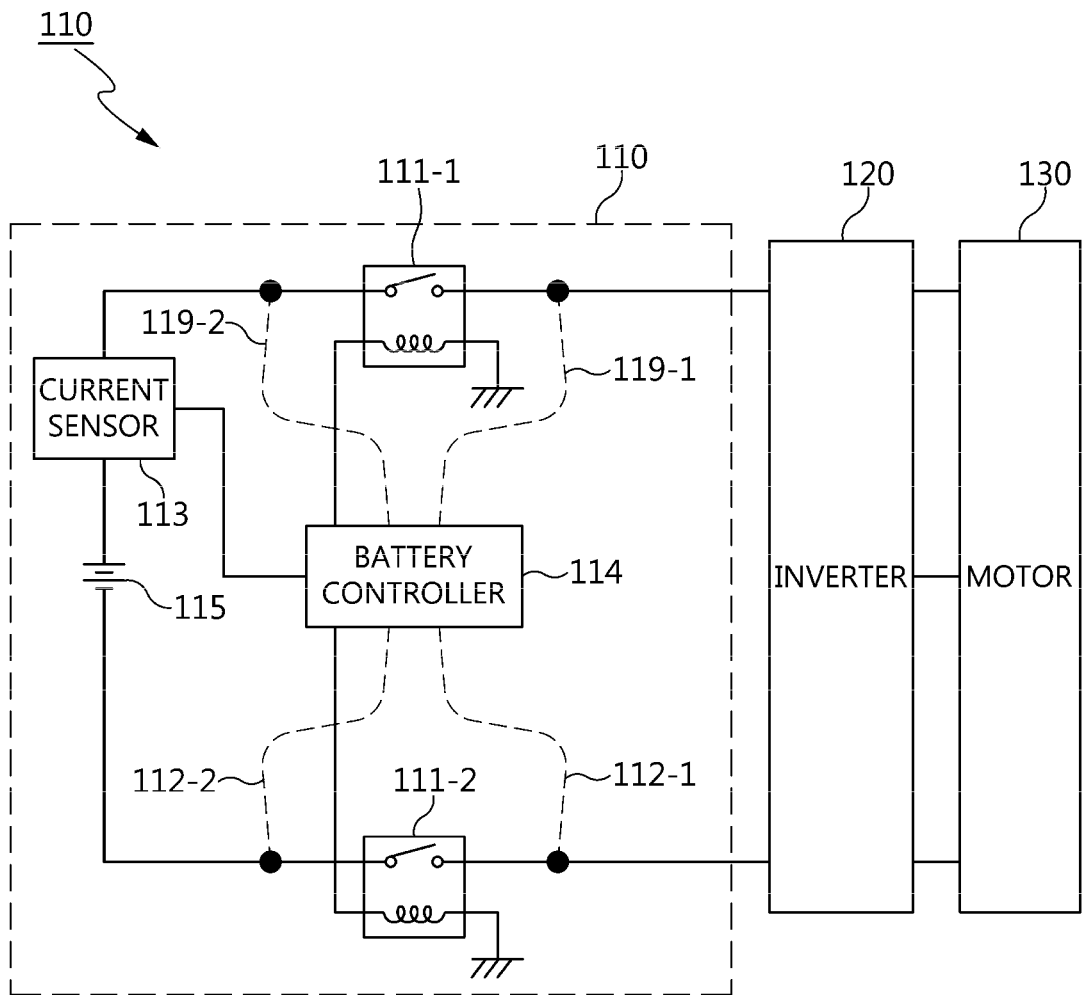
FIG. 1 is a structural block diagram of a relay temperature measuring device according to one exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

While the present disclosure is susceptible to various modifications and may have a variety of exemplary embodiments, specific embodiments thereof will be illustrated by way of example in the drawings and described in detail in the detail description. It is to be understood, however, that the present disclosure is not intended to be limited to the particular embodiments, but includes all modifications, equivalents, and alternatives falling within the spirit and scope of the present disclosure.

Similar reference numerals are used to indicate similar components in describing each drawing. The terms "first", "second", etc. may be used to describe various components, but the components should not be limited by those terms. The above terms are used merely for the purpose to distinguish a component from the other component. For example, a first component may be named a second component, and similarly, a second component may be named a first component without departing from the scope of right of the disclosure.

Unless otherwise defined, all terms used herein, including technical or scientific terms, have the same meaning as those commonly understood by one of ordinary skill in the art to which the present disclosure pertains. Terms such as those defined in commonly used dictionaries should be interpreted as having a meaning consistent with the meaning in the context of the relevant art and, unless expressly defined in the present application, should not be interpreted as an ideal or overly formal sense.

Hereinafter, a device and method for measuring a temperature of relay according to the one exemplary embodiment of the present disclosure will be described in detail with reference to the accompanying drawings. FIG. 1 is a structural block diagram of a relay temperature measuring device 100 according to one exemplary embodiment of the present disclosure. Referring to FIG. 1, the relay temperature measuring device 100 may include a battery system 110, an inverter 120 configured to receive power from the battery system 110, a motor 130 configure to receive 3-phase power converted by the inverter 120 and to be driven, and the like.

The battery system 110 may include a battery 115, a sensor 113 configured to measure an output of the battery 115 and generate output measurement information, relays 111-1 and 111-2 disposed on a conductive line between the battery 115 and a load (e.g., the inverter, the motor, and the like), a controller 114 configured to connect or disconnect the relays 111-1 and 111-2 using a relay temperature, and the like. The battery 115 is configured by arranging battery cells (not shown) in series and/or in parallel, and a high-voltage battery cell for an electric vehicle such as a nickel metal battery cell, a lithium ion battery cell, a lithium polymer battery cell, an all-solid battery cell, and the like may be employed as the above battery cell. Generally, the high-voltage battery is a battery used as a power source for driving an electric vehicle and the high-voltage refers to a high voltage of 100 V or greater. However, the battery 15 in the present disclosure is not limited thereto, and a low-voltage battery may be employed as the battery 115.

The sensor 113 may be configured to measure the output of the battery 115 and generate the output measurement information. For this purpose, a sensor such as a Hall sensor, an optical fiber current sensors, a current transformer (CT) type current sensor, and the like may be employed as the sensor 113. The relays 111-1 and 111-2 may include a first relay 111-1 disposed between a positive end of the battery 115 and a load and a second relay 111-2 disposed between a negative end of the battery and a load.

The controller 114 may be configured to measure both ends of a conductor in a vehicle to generate both-end measurement power information. Accordingly, measurement connection lines 112-1, 112-2 and 119-1, 119-2 may be connected to both ends of conductors of the relays 111-1 and 111-2, respectively. Further, the controller may be configured to compare a relay temperature calculated using the both-end measurement power information and the output measurement information generated by the current sensor 113 with a preset temperature reference value, and connect or disconnect the relays 111-1 and 111-2 based on a comparison result.

For the inverter 120, a pulse width modulation (PWM) inverter which is a voltage source inverter may be employed. However, the present disclosure is not limited thereto, and a current source inverter in which some structural elements are modified is applicable to the inverter 120. In the PWM inverter using rectified direct current (DC) voltage, voltage and frequency may be simultaneously adjusted by a PWM control method. A three-phase alternating current (AC) motor may be employed as the motor 130. In addition, an interior permanent magnet motor may be employed as the motor 130. However, the present disclosure is not limited thereto, and a universal motor and the like may be used.

Figure 2:
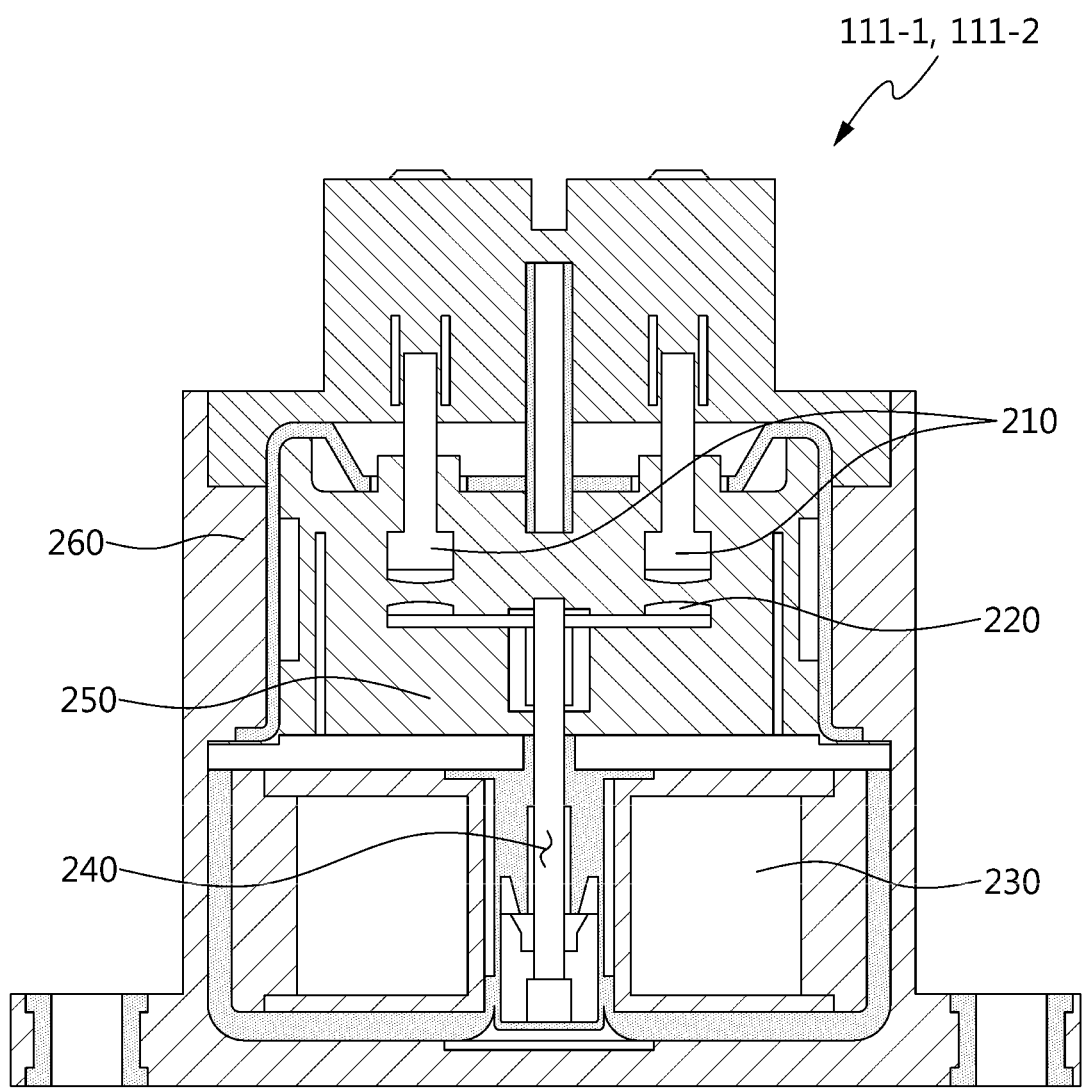
FIG. 2 is a view showing an example of an internal configuration of a relay illustrated in FIG. 1 according to an exemplary embodiment of the present disclosure.

FIG. 2 is a view showing an example of an internal configuration of each of the relays 111-1 and 111-2 illustrated in FIG. 1. Referring to FIG. 2, when power is applied to a coil 230 in a state in which two fixed contacts 210 are separated from each other, a movable contact 250 may be moved together with a driving section 240 by an electromagnetic force. Accordingly, two fixed contacts 210 are brought in contact with two contact points 220 formed on the movable contact 250, respectively, to electrically connect two fixed contacts 210 separated from each other. The above described components may be disposed in the housing 260.

Figure 3:
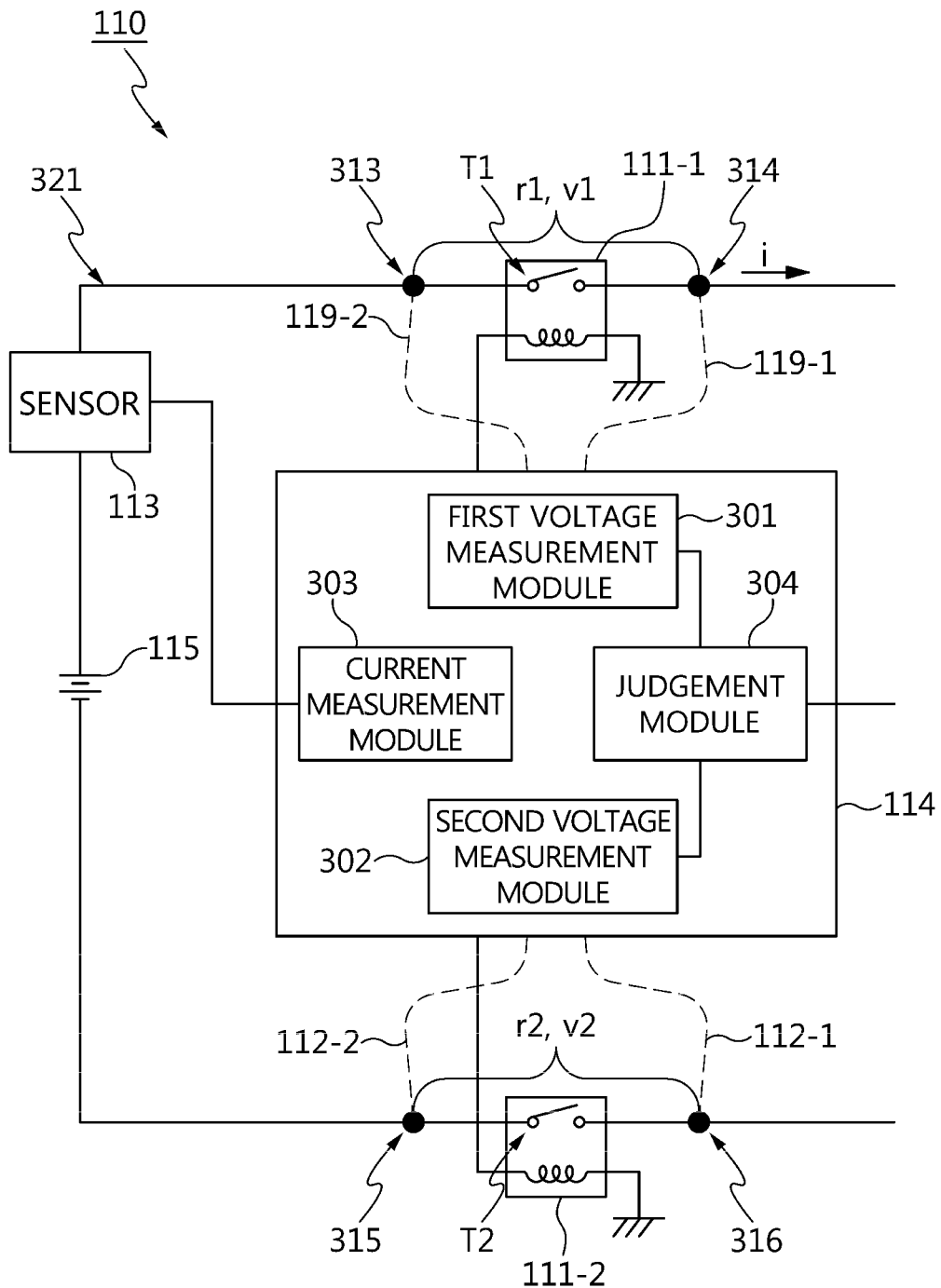
FIG. 3 is a detailed structural block diagram of a battery system illustrated in FIG. 1 according to an exemplary embodiment of the present disclosure.

FIG. 3 is a detailed structural block diagram of the battery system 110 illustrated in FIG. 1. Referring to FIG. 3, the controller 114 may include measurement modules 301, 302 and 303 configured to measure both ends of the conductor in the vehicle and generate the both-end measurement power information and a judgement module 304 configured to estimate the relay temperature of the relays 111-1 and 111-2 using the both-end measurement power information and the output measurement information, compare the relay temperature with the reference value and connect or disconnect the relays 111-1 and 111-2 based on the comparison result.

Particularly, the measurement modules 301, 302 and 303 may include a first voltage measurement module 301 configured to measure a voltage at both end measurement contact points 313 and 314 of the first relay 111-1, a current measurement module 303 configured to measure a current from the current sensor 113, and a second voltage measurement module 302 configured to measure a voltage at both end measurement contact points 315 and 316 of the second relay 111-2.

The battery 115 may be configured to continuously supply the current for operating an electric power system of an environmentally friendly vehicle. The current passes through a conductor 321, which is composed of cables, bus bars, etc. inside the battery system 110, and the relays 111-1 and 111-2. At this time, power consumption occurs based on a resistance and current of a path through which the current flows, which may be converted into heat energy to increase a temperature of the path through which the current flows. In particular, for the relays 111-1 and 111-2, resistance at contact areas of the both end measurement contact points 315 and 316 is increased, and thus, the temperature is likely to be increased. Particularly, when the temperature is increased, failure of the relay may be caused by fusion of the contact portion and the like.

In one exemplary embodiment of the present disclosure, voltage of both ends of the relay may be measured to calculate the resistance of both ends of the relay, and a temperature of the conductor of the relay may be determined through the above resistance. As a result, when the temperature is greater than a predetermined temperature, the current may be reduced by reducing the output of electric power parts or the current may be interrupted by disconnecting the relay. When a current i flows in the battery system 110 and the resistance of the both end measurement contact points 315 and 316 of the relay 111-1 is r1, there is a relation of a voltage $v1=i*r1$.

The term "~ module" in FIG. 3 refers to a unit for processing at least one function or operation, which may be implemented by hardware, software or a combination of hardware and software. The hardware may be implemented by an application specific integrated circuit (ASIC), a digital signal processing (DSP), a programmable logic device (PLD), a field programmable gate array (FPGA), a processor, a controller, a microprocessor, another electronic unit, which are designed to perform the above described function, or a combination thereof. The software may be implemented as the module that performs the above-described functions.

The software may be stored in a memory unit and is executed by a processor. As the memory unit or the processor, various means which have been well known to those skilled in the art may be employed.

Figure 4:
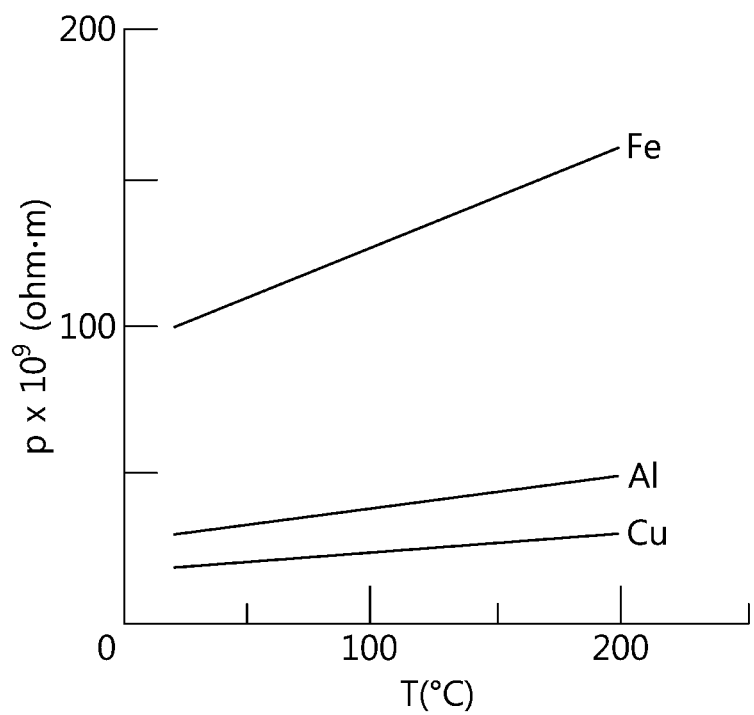
FIG. 4 is a graph showing a conventional relation between a temperature and a metal resistance according to the related art.

FIG. 4 is a graph showing a conventional relation between a temperature and metal resistance according to the related art. Referring to FIG. 4, the x-axis represents a temperature and the y-axis represents metal resistance ($\rho$). Since the resistance of metal (Fe, Al, Cu) is increased as the temperature is increased as shown in FIG. 4, it is possible to determine a temperature T1 of the relay 111-1 using the resistance r1.

The controller 114 may be configured to measure the voltage v1 using the first voltage measurement module 301, measure a current i in the current measurement module 303 using the output signal of the current sensor 113 and calculate the resistance r1 in the judgement module 304. The judgement module 304 may be configured to store the resistance value based on the temperature between the both end measurement contact points 315 and 316 of the relay 111-1 in the form of a table and a formula, and derive the temperature T1 using the calculated r1. For the second relay 111-2 on the (–) side, a voltage v2 may be measured in the same manner to calculate a resistance r2 and derive a temperature T2. The table may be a temperature-dependent resistance table based on relay characteristics. In the case of the formula, since a calculation formula for converting a conductor resistance into a temperature has been widely known, a further description thereon will be omitted.

When the relay temperature T1 or T2 is increased to an over temperature level Tth (for example, about 100° C.~150° C.) which is a preset reference value, the controller 114 may be configured to request a superordinate controller (not shown) of the battery system 110 to reduce the output of the electric power system, to prevent an increase of the relay temperature using a reduction of the current. Alternatively, the controller 114 may be configured to disconnect the relays 111-1 and 111-2 to interrupt the current. An electronic control unit (ECU), a hybrid control unit (HCU), a vehicle control unit (VCU) and the like may be the superordinate controller. Therefore, the superordinate controller may include a microprocessor, a memory, an electronic circuit and the like.

Figure 5:
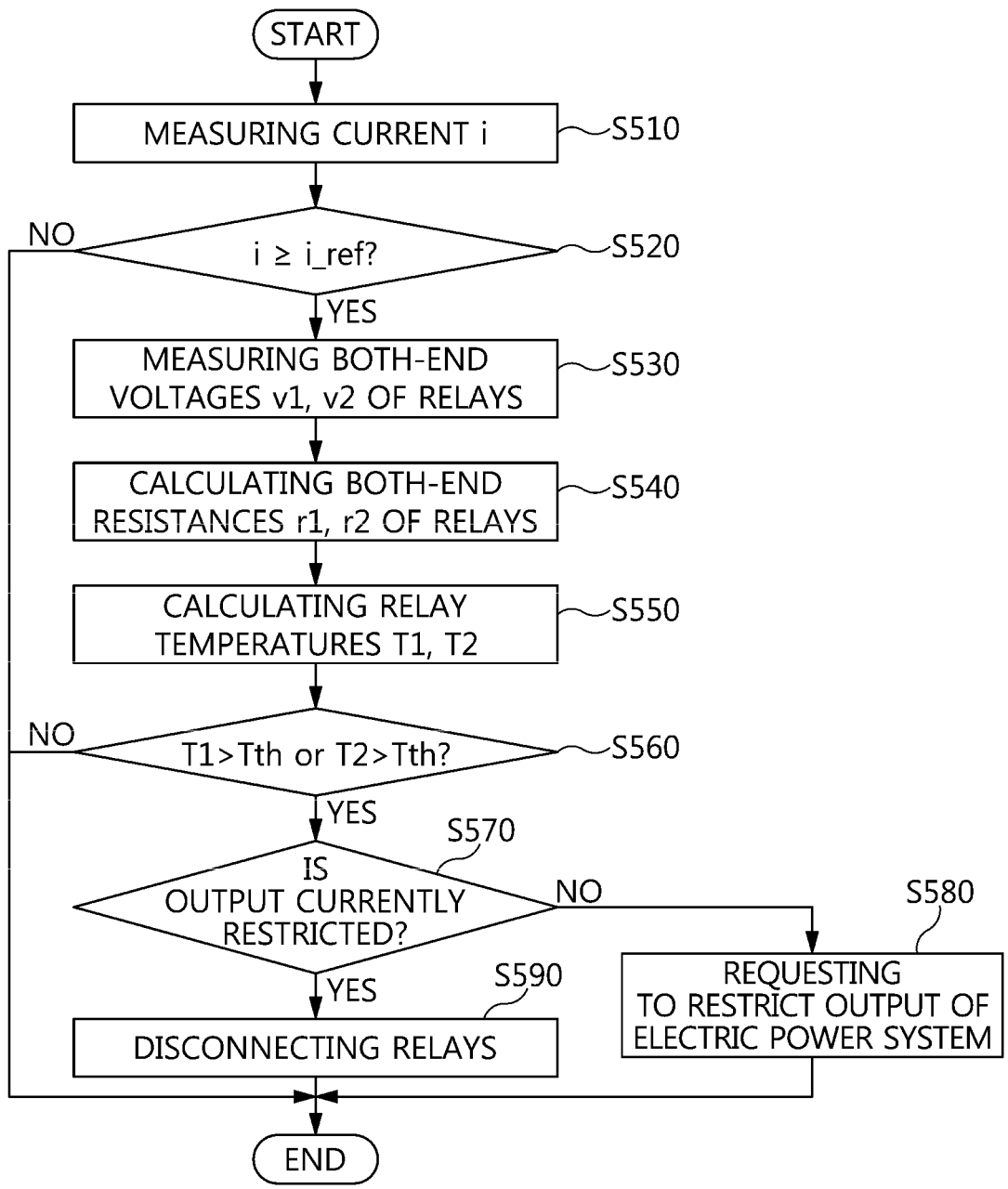
FIG. 5 is a flow chart showing a relay temperature measuring process according to one exemplary embodiment of the present disclosure.

FIG. 5 is a flow chart showing a relay temperature measuring process according to one exemplary embodiment of the present disclosure. Referring to FIG. 5, current measurement information measured in the current sensor 113 (in FIG. 3) may be detected through the current measurement module 303 of the controller 114 (in FIG. 3) (Step S510). When the measured current i is less than a predetermined current, decreased both-end voltage of the relay is generated (v1=i*r1), and thus, the both-end voltage value and resistance value of the relay may be incorrect. Additionally, since the relay temperature (i.e., conductor temperature) has a high possibility of occurrence of over-temperature when a large current flows, a relay temperature detection may be unnecessary when a small current flows.

Therefore, only when the current is equal to or greater than the preset reference current i_ref, may the controller 114 proceed to a subsequent process (Step S520). In other words, when the measured current i is greater than the reference current i_ref in the step S520, the both-end voltages v1 and v2 of the relays may be measured, and the both-end resistances r1 and r2 of the relays may then be calculated using the measured current and voltage. (Steps S530 and S540). In other words, only when the voltage and the resistance are equal to or greater than the particular values v_ref and r_ref, may the controller proceed to a subsequent process.

Subsequently, the judgment module 304 (in FIG. 3) of the controller 114 may be configured to estimate the relay temperatures T1 and T2 using the calculated resistances (Step S550). In other words, the temperature may be obtained using the temperature-dependent resistance table or a relation formula between a temperature and a resistance based on preset relay characteristics. When the relay temperature is calculated, the judgement module 304 may be configured to determine whether the relay temperature T1 or T2 is greater than the over-temperature protection reference temperature Tth (Step S560). In the step S560, if the relay temperature T1 or T2 is greater than the over-temperature protection reference temperature Tth, whether the battery system 110 is in the state in which the output is being currently restricted may be determined (Step S570).

In the step S570, if the battery system is not in the state in which the output is being currently restricted, the controller 114 may be configured to request the superordinate controller (not shown) to restrict the output of the external electric power system (Step S580). In the step S570, unlike the above, if the battery system is in the state in which the output is being currently restricted, the controller may be configured to disconnect the relays 111-1 and 111-2 (Step S590). Even though the battery system is not in the state in which the output is being currently restricted, when the over-temperature state is maintained, the controller may be configured to disconnect the relays as in the step S590.

When an output restriction is requested in the step S580, the output restriction may be requested in the form of a certain value or a weight for the current temperature may be applied with the table and the formula for the relay temperatures T1 and T2. Further, it may also be possible to derive an allowable current from the table or the formula utilizing the resistance values r1 and r2 calculated in the step S40 and request it.

Figure 6:
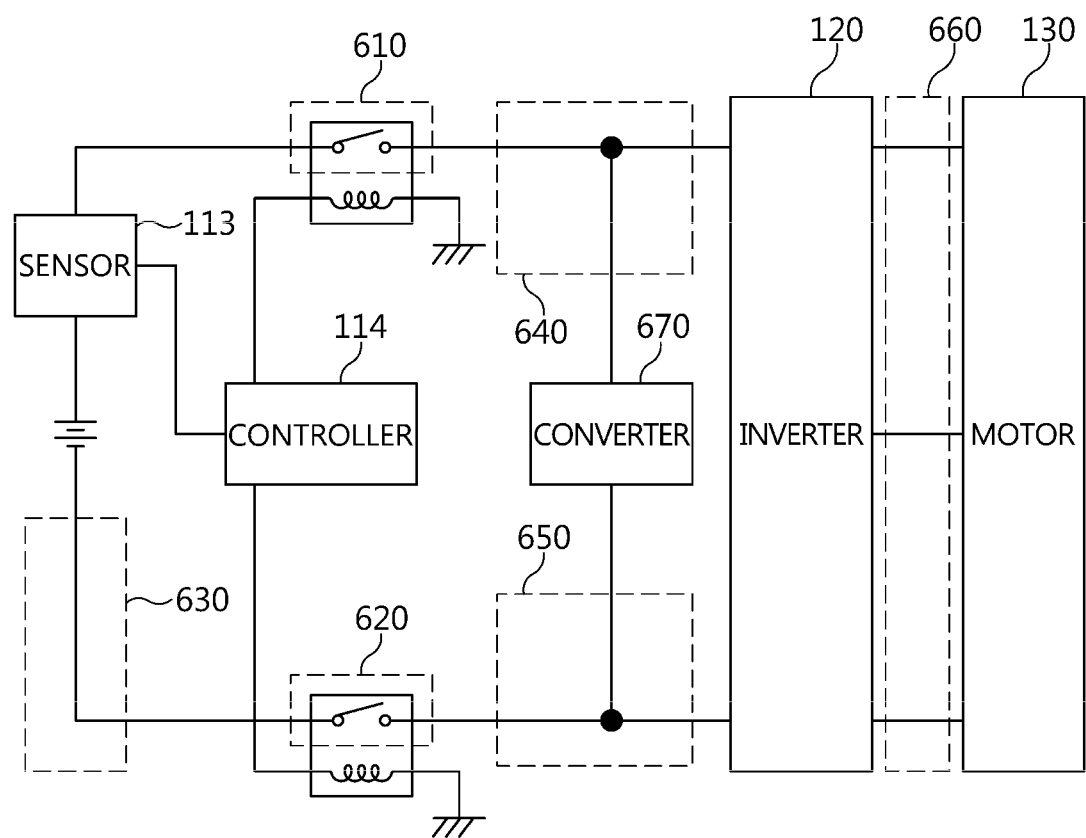
FIG. 6 is a structural block diagram of a relay temperature measuring device according to another exemplary embodiment of the present disclosure.

FIG. 6 is a structural block diagram of a relay temperature measuring device according to another exemplary embodiment of the present disclosure. Referring to FIG. 6, a method of measuring both ends may include measuring, in addition to both ends of each of the relays 111-1 and 111-2 illustrated in FIGS. 1 to 5, both ends of a bus bar in which the current from the battery 115 (in FIG. 3) flows, both ends of an internal conductor 630 and the like in the vehicle, both ends of each of cables 640 and 650 connected between the inverter 120 and a converter 670, and both ends of a power line 660 connecting the inverter 120 and the motor 130. In addition to the above described components, depending on the configuration of an electric power system of the vehicle, the present method may be applied to various parts. Depending on the position and role, in addition, a variety of controllers may be utilized for the information processing such as a voltage measurement, resistance and temperature extraction and the like to each region.

Figure 7:
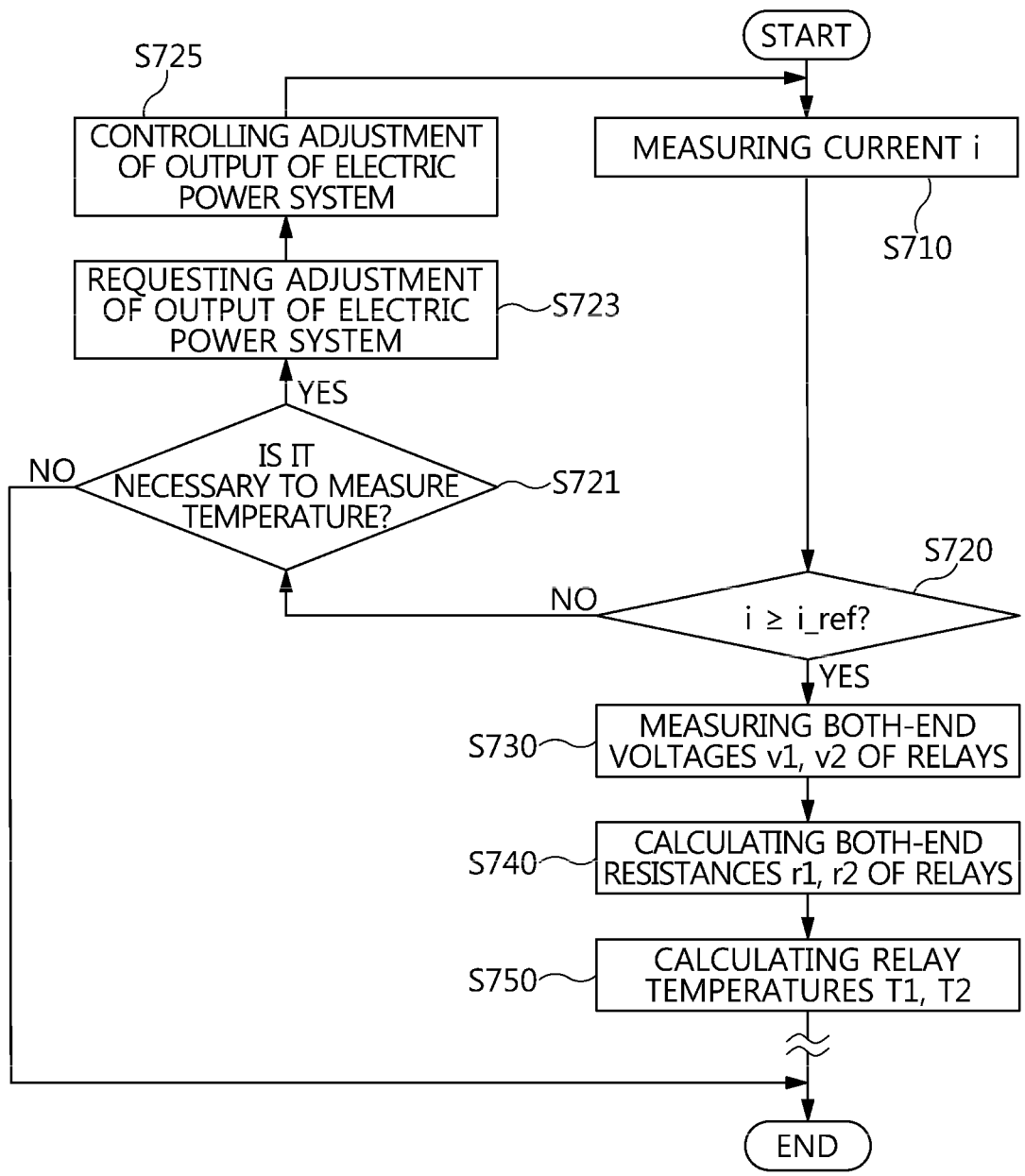
FIG. 7 is a flow chart showing a relay temperature measuring process according to another exemplary embodiment of the present disclosure.

FIG. 7 is a flow chart showing a relay temperature measuring process according to another exemplary embodiment of the present disclosure. In particular, FIG. 7 shows a concept for improving a temperature detection accuracy by adding cooperative control between the controller 114 of the battery system 110 and other vehicle-mounted controller (not shown) in the process described in FIG. 5. Accordingly, FIG. 7 is a flowchart showing an example according to the above concept, and some modifications in FIG. 5 are applied to the method in FIG. 7.

Referring to FIG. 7, when the measured current i is less than the reference current i_ref in the step S720, without immediately ending the process, the controller 114 may be configured to determine whether a current situation is a situation in which the temperature of the relays 111-1 and 111-2 should be measured (Step S721). In addition, the vehicle information such as a surrounding environmental temperature, status information of the battery 115, and traveling condition information are considered. In particular, the status information may include state of charge (SOC), state of health (SOHO), depth of discharging (DOD), state of function (SOF) and the like generated by monitoring the battery 115.

In response to determining in the step S721 that a relay temperature measurement is necessary, the controller 114 may be configured to request (e.g., send a control signal to) a controller of another electric power system (e.g., an inverter, a converter, etc. may be included.) in the vehicle to adjust the output (Step S723). At this time, the electric power system must be driven according to the intention of the driver while increasing the output. Thus, for example, by operating the motor in a low efficiency manner when the inverter 120 operates the motor 130, it may be possible to increase the current i while satisfying a torque required by a driver to perform an output adjustment (Step S725). In addition to the inverter, other components of the electrical power system may be utilized in the same way.

Further, in the steps S723 and S725, the current i may be maintained greater than the reference current i_ref by cooperative control of the controller and other controllers. Alternatively, by maintaining a state in which the current i is equal to the reference current i_ref (i=i_ref) for a particular period of time, it may be possible to enhance the measurement accuracy. Additionally, in response to determining in the step S721 that the temperature measurement is not necessary, the controller may terminate this process and proceed to a subsequent process. The steps S710, S720 to S750 are similar to the steps S510 to S550 illustrated in FIG. 5, so that a description thereon is omitted.

The steps of the method or algorithm described in connection with the embodiments disclosed herein may be embodied in the form of program instructions, which may be performed via a variety of computer means, and recorded in a non-transitory computer-readable recording medium. The above non-transitory computer-readable recording medium may include a program (instruction) code, a data file, a data structure, or the like alone or in combination.

The program (instruction) code recorded in the above-described medium may be those specially designed and configured for the present disclosure or may be those known and available to those skilled in a computer software field. Examples of the non-transitory computer-readable recording medium may include magnetic media such as a hard disk, a floppy disk, a magnetic tape and the like, optical media such as a CD-ROM, a DVD, Blu-ray and the like, and semiconductor memory devices such as a ROM, a RAM, a flash memory and the like, which are specifically configured to store and execute a program (instruction) code.

In particular, an example of the program (instruction) code includes a high-level language code that can be executed by a computer using an interpreter or the like, as well as machine language code such as that produced by a compiler. The above-mentioned hardware device may be configured to be operated as one or more software modules for performing the operations of the present disclosure, and vice versa.

According to the present disclosure, when a temperature of the high-voltage relay temperature of the battery system is measured, it may be possible to detect the temperature by measuring a both-end voltage of the relay without using a temperature sensor. Also, another effect of the present disclosure may be that it may be possible to measure the relay temperature without significantly changing the components of a conventional electric power system.

In addition, still another effect of the present disclosure may be that the device and method of the present disclosure may be utilized for detecting a temperature of other components in which a high-voltage current flows, in addition to the relay of the battery system. Furthermore, another effect of the present disclosure may be that it may be possible to prevent an erroneous detection and improve reliability by applying the above-described detection method and it may be possible to protect the vehicle by taking appropriate measures when an over-temperature occurs.

Although the present disclosure has been described with a focus on novel features of the present disclosure applied to various embodiments, it will be apparent to those skilled in the art that various deletions, substitutions, and changes in the form and details of the apparatus and method described above may be made without departing from the scope of the present disclosure. Accordingly, the scope of the present disclosure is defined by the appended claims rather than by the foregoing description. All modifications within the equivalent scope of the appended claims are embraced within the scope of the present disclosure.

What is claimed is:

1. A relay temperature measuring method, comprising:
measuring, by a sensor, an output of a battery to generate output measurement information;
measuring, by a controller, both ends of a conductor in a vehicle to generate both-end measurement power information;
comparing, by the controller, a relay temperature, calculated using the output measurement information, with a preset temperature reference value; and
connecting or disconnecting, by the controller, one or more relays disposed on a conductive line between the battery and a load, based on a comparison result;
wherein the relay temperature is calculated without a temperature sensor.

2. The relay temperature measuring method of claim 1, wherein the relay temperature is calculated using a temperature-dependent resistance table based on preset relay characteristics.

3. The relay temperature measuring method of claim 1, wherein the relay temperature is calculated using a relation formula between a temperature and a resistance based on preset relay characteristics.

4. The relay temperature measuring method of claim 1, wherein generating the output measurement information includes not generating, by the controller, the both-end measurement power information when the output measurement information is less than a preset output reference value of the battery.

5. The relay temperature measuring method of claim 1, wherein comparing the relay temperature includes not calculating, by the controller, the relay temperature when the both-end measurement power information is less than a preset both-end measurement power reference value.

6. The relay temperature measuring method of claim 1, wherein connecting or disconnecting the one or more relays includes disconnecting, by the controller, the relays when the relay temperature is greater than the temperature reference value and the battery is in a state in which an output is restricted.

7. The relay temperature measuring method of claim 1, wherein connecting or disconnecting the one or more relays includes requesting, by the controller, a superordinate controller to restrict the output when the relay temperature is greater than the temperature reference value and the battery is not in a state in which an output is restricted.

8. The relay temperature measuring method of claim 1, wherein generating the output measurement information includes requesting, by the controller, a superordinate controller to adjust the output of the battery when the output measurement information is less than a preset output reference value of the battery and a measurement of the relay temperature is required according to vehicle information.

* * * * *